(12) United States Patent
Bengtsson et al.

(10) Patent No.: US 8,589,061 B2
(45) Date of Patent: Nov. 19, 2013

(54) FORWARD COLLISION RISK REDUCTION

(75) Inventors: Mattias Bengtsson, Billdal (SE); Andreas Eidehall, Mölndal (SE); Anders Agnvall, Lindome (SE)

(73) Assignee: Volvo Car Corporation, Goeteborg (SE)

( * ) Notice: Subject to any disclaimer, the term of this patent is extended or adjusted under 35 U.S.C. 154(b) by 147 days.

(21) Appl. No.: 13/109,301

(22) Filed: May 17, 2011

(65) Prior Publication Data

US 2011/0288774 A1 Nov. 24, 2011

(30) Foreign Application Priority Data

May 17, 2010 (EP) .................................... 10162942

(51) Int. Cl.
*G08G 1/16* (2006.01)
*B60Q 1/00* (2006.01)

(52) U.S. Cl.
CPC ... *G08G 1/16* (2013.01); *B60Q 1/00* (2013.01)
USPC ............ 701/301; 340/435; 340/436; 180/275

(58) Field of Classification Search
USPC ............ 701/300–302, 36; 340/901–904, 436
See application file for complete search history.

(56) References Cited

U.S. PATENT DOCUMENTS

| | | | |
|---|---|---|---|
| 5,594,414 A * | 1/1997 | Namngani ..................... | 340/436 |
| 6,223,125 B1 * | 4/2001 | Hall ............................... | 701/301 |
| 6,337,637 B1 * | 1/2002 | Kubota et al. ................. | 340/901 |
| 7,034,668 B2 * | 4/2006 | Engelman et al. ............. | 340/435 |
| 7,095,336 B2 * | 8/2006 | Rodgers et al. ............... | 340/903 |
| 7,124,027 B1 * | 10/2006 | Ernst et al. .................... | 701/301 |
| 7,409,295 B2 * | 8/2008 | Paradie ......................... | 701/301 |
| 8,164,432 B2 * | 4/2012 | Broggi et al. ................. | 340/435 |
| 8,170,789 B2 * | 5/2012 | Aung ............................ | 701/400 |
| 2005/0192736 A1 * | 9/2005 | Sawada et al. ................ | 701/117 |
| 2005/0203705 A1 * | 9/2005 | Izumi et al. ................... | 701/301 |
| 2008/0042814 A1 | 2/2008 | Hurwitz et al. | |
| 2008/0243389 A1 * | 10/2008 | Inoue et al. ................... | 701/301 |
| 2009/0143987 A1 * | 6/2009 | Bect et al. .................... | 701/301 |

(Continued)

FOREIGN PATENT DOCUMENTS

| | | |
|---|---|---|
| DE | 102007015032 A1 | 1/2008 |
| EP | 2001003 A1 | 12/2008 |
| WO | 2009028558 A1 | 3/2009 |

OTHER PUBLICATIONS

European Search Report for corresponding Application No. 10162942.6, mailed Nov. 16, 2010, 12 pages.

(Continued)

*Primary Examiner* — Thomas Tarcza
*Assistant Examiner* — Tyler J Lee
(74) *Attorney, Agent, or Firm* — Brooks Kushman P.C.

(57) ABSTRACT

A method for determining a safety zone of a foreign object for a forward collision risk reduction system. The method may include determining the type of the foreign object; setting the safety zone to a predetermined value corresponding to the type of the foreign object; determining the traffic behavior of the foreign object; determining if the traffic behavior corresponds to a species of a predetermined group of traffic behaviors; and if the traffic behavior corresponds to a species of a predetermined group of traffic behaviors, modifying the safety zone in accordance with a predetermined species function corresponding to the species.

20 Claims, 6 Drawing Sheets

(56) References Cited

U.S. PATENT DOCUMENTS

| | | | |
|---|---|---|---|
| 2009/0182505 A1* | 7/2009 | Ikeda | 701/301 |
| 2009/0192710 A1* | 7/2009 | Eidehall et al. | 701/301 |
| 2010/0205132 A1 | 8/2010 | Taguchi | |
| 2011/0178710 A1* | 7/2011 | Pilutti et al. | 701/301 |
| 2011/0307176 A1* | 12/2011 | Sun et al. | 701/301 |

OTHER PUBLICATIONS

N. Kehtamavaz et al., "Establishing Collision Zones for Obstacles Moving with Uncertainty", 2435 Computer Vision, Graphics, and Image Processing, 49, Jan. 1990, No. 1, Duluth, MN, pp. 95-103.

* cited by examiner

FORWARD COLLISION RISK REDUCTION

CROSS-REFERENCE TO RELATED APPLICATIONS

This application claims foreign priority benefits under 35 U.S.C. §119(a)-(d) to EP 10162942.6, filed May 17, 2010, which is hereby incorporated by reference in its entirety.

TECHNICAL FIELD

The present invention relates to a method for determining a safety zone of a foreign object for a forward collision risk reduction system.

BACKGROUND

A current trend in the automotive industry is to introduce active safety systems for avoiding or mitigating collisions. Such a system generally estimates the state of objects ahead of a vehicle, for instance by using a sensor. Moreover the system generally, based on the estimated state of the object, determines if any action needs to be taken, e.g. issuing a warning to the driver or initiating autonomous braking of the vehicle.

Although a system as described hereinabove is useful for reducing the risk of a forward collision, such a system may also have some disadvantages. For instance, there may be a risk that the state of the object is incorrectly assessed. Such an incorrect assessment may result in a belated warning and/or autonomous braking which in turn may result in a potentially dangerous traffic situation.

Another disadvantage is that the incorrect assessment may result in the system issuing an unnecessary and/or inadvertent collision risk reduction task, such as a warning and/or autonomous braking. Unnecessary and/or inadvertent autonomous braking may result in a dangerous traffic situation, for instance it may result in an increased risk that a following vehicle will hit the hosting vehicle from behind. Moreover, if the system issues warnings for traffic situations which are not perilous at all, there may be a risk that the driver of the vehicle hosting the system will start to ignore the warnings issued by the system or that the driver will simply disengage the system.

As may be realized, there is a need for improvement of the active safety systems for avoiding or mitigating collisions between a vehicle and a foreign object.

SUMMARY

One object of the invention is to reduce or ameliorate at least one of the disadvantages of the prior art systems and/or methods, or to provide a useful alternative.

This object is achieved by a method for determining a safety zone.

As such, one non-limiting aspect of the present invention relates to a method for determining a safety zone of a foreign object for a forward collision risk reduction system. The foreign object may be located in front of a vehicle hosting the system. The method may include:
  determining the type of the foreign object;
  setting the safety zone to a predetermined value corresponding to the type of the foreign object;
  determining the traffic behaviour of the foreign object;
  determining if the traffic behaviour corresponds to a species of a predetermined group of traffic behaviours, and if the traffic behaviour corresponds to a species of a predetermined group of traffic behaviours, modifying the safety zone in accordance with a predetermined species function corresponding to the species.

By the method for determining a safety zone according to the present invention, it is possible to obtain a more accurate forward collision risk reduction system since such a system may have the possibility to take different measures, e.g. issuing warnings and/or initiating automatic collision risk reduction operations, dependent not only on the type of foreign object that the vehicle is encountering, e.g. if the foreign object is a pedestrian, a vehicle or a lamp post, but also on the traffic behaviour that the foreign object displays. This means that the forward collision risk reduction system will be able to select an appropriate task with an increased level of certainty which, in turn, implies that the system actually will obtain, as compared to prior art systems, an improved functionality as regards risk reduction capabilities. Moreover, a system executing a method according to the present invention may also be less prone to issuing incorrect, or false, warnings and/or automatic collision risk reduction operations.

As used herein, the expression "safety zone" relates at least to the width, i.e. an extension in a direction substantially perpendicular to the forward direction of the hosting vehicle, of the foreign object as well as a possible margin on at least one side, but preferably both sides, of the foreign object.

The safety zone may be symmetrically distributed around the foreign object such that the margin on one side of the object is substantially equal to the margin on the other side of the object. Optionally, the safety zone may be asymmetrically distributed around the foreign object such that the margin on one side of the object is greater than the margin on the other side of the object.

Moreover, the safety zone may further comprise information as regards the position of the foreign object with respect to the hosting vehicle. Furthermore, the safety zone may comprise a margin in the forward direction of the hosting vehicle.

The abovementioned predetermined species function corresponding to the species may be dependent on further parameters. Purely by way of example, at least one, but preferably a plurality, of the species functions involves an operation of modifying the safety zone depending on the speed of the hosting vehicle. Purely by way of example, the species function may be formulated such that the safety zone increases with increasing speed of the vehicle.

It should be noted that the method steps of the method of the invention need not be carried out in the order presented hereinabove. Instead, certain method steps may for example be performed in reversed order or in parallel.

According to the invention, the predetermined group may comprise a species that the foreign object is stationary. As used herein, the expression "stationary" means that the foreign object has a velocity with a magnitude below a predetermined value, preferably a magnitude lower than 0.5 m/s.

The inventors of the present invention have realized that a vehicle may for instance pass a stationary object, which object is located besides a vehicle path, e.g. a roadway on which the vehicle is travelling, with only a small margin without exposing either the vehicle or the foreign object to any substantial risks. As such, using the above steps of the present invention, the number of false or unnecessary warnings and/or autonomous risk reduction operations may be reduced.

As used herein the expression "vehicle path" relates to the path the vehicle is expected to follow. The extension of the vehicle path may be determined using inter alia information as regards static as well as dynamic features of the vehicle.

Moreover, the vehicle path may be determined by using information of the curvature of the roadway on which the vehicle may travel.

One non-limiting aspect of the present invention relates to a method for reducing the risk of a forward collision between a vehicle and a foreign object. The method may include:
   establishing the presence of the foreign object in front of the vehicle;
   determining a safety zone using a safety zone determination method according to the first aspect of the present invention;
   determining if the vehicle can avoid entering the safety zone, and
   if not, executing a collision risk reduction task.

Purely by way of example, a collision risk reduction task may for instance include an operation of steering away from the foreign object and/or an operation of braking the hosting vehicle.

One non-limiting aspect of the present invention relates to a computer program product comprising a computer program containing computer program code executable in a computer or a processor to implement all the steps of a method according to the present invention. The product may preferably be stored on a computer-readable medium or transportable through a carrier wave.

One non-limiting aspect of the present invention relates to an electronic control unit comprising a computer program product according to the third aspect of the present invention and arranged to execute a method according to the first and/or second aspect of the present invention.

One non-limiting aspect of the present invention relates to an automotive vehicle forward collision risk reduction system comprising an electronic control unit according the fourth aspect of the present invention.

One non-limiting aspect of the present invention relates to an automotive vehicle comprising an automotive vehicle forward collision risk reduction system according to the fifth aspect of the present invention.

One non-limiting aspect of the present invention relates to a method of upgrading an automotive vehicle forward collision risk reduction system by executing the computer program product according to the third aspect of the present invention.

BRIEF DESCRIPTION OF THE DRAWINGS

The present invention will hereinafter be explained in greater detail by means of non-limiting examples and with reference to the appended drawings in which.

It should be noted that the appended drawings are not necessarily drawn to scale and that the dimensions of some features of the present invention may have been exaggerated for the sake of clarity.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention will, in the following, be exemplified by embodiments. It is to be understood, however, that the embodiments are included in order to explain principles of the invention and not to limit the scope of the invention defined by the appended claims.

Figure 1:
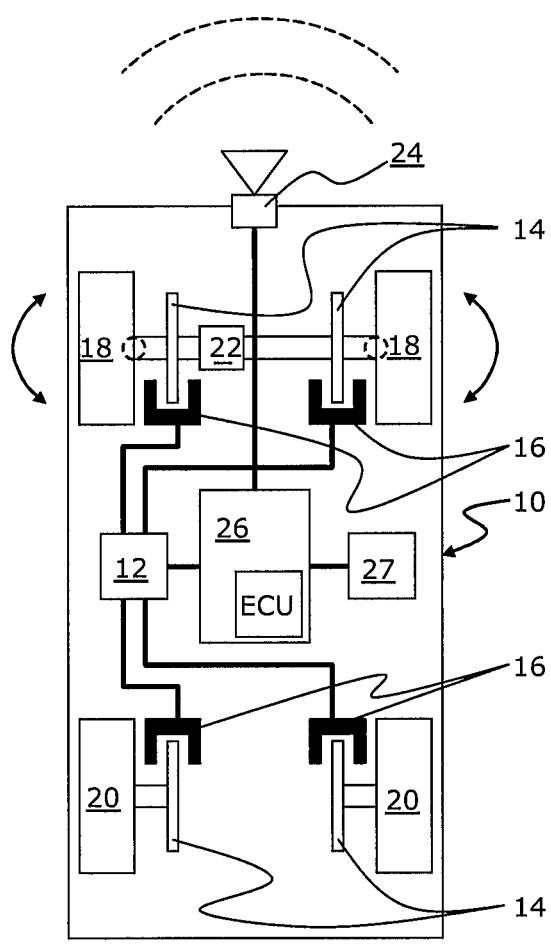
FIG. 1 illustrates a vehicle equipped with a system of the present invention.

FIG. 1 illustrates schematically a vehicle 10 hosting a system in accordance with the present invention. The host vehicle 10 has a braking system 12 such as an Antilock Brake System (ABS system), e.g. with brake discs 14 and appertaining calipers 16 associated with each of the front wheels 18 and rear wheels 20 of the host vehicle 10. However, the system of the present invention may of course be used on vehicles having other types braking systems, such as for instance a drum brake system (not shown).

The host vehicle 10 further usually has a power steering system 22, which is arranged to control the steering angle of the front wheels 18. The vehicle further comprises a sensor 24, such as a RADAR (RAdio Detection And Ranging), LIDAR (LIght Detection And Ranging), LASER (Light Amplification by Stimulated Emission of Radiation) or a camera based sensor. The sensor is mounted on the vehicle 10, preferably at the front end of the host vehicle 10, and is arranged to monitor the region in front of the host vehicle 10. The host vehicle 10 may also be provided with a plurality of sensors (not shown in FIG. 1) of the same type or even of different types.

The host vehicle 10 further comprises the system 26 of the invention. As may be gleaned from FIG. 1, the system 26 is preferably connected to the at least one sensor 24 as well as the braking system 12. Further, the system 26 is preferably connected to means for issuing an acoustic and/or visual alarm actuated through an alarm actuator 27.

The system 26 according to the present invention is capable of executing a method for determining a safety zone of a foreign object in accordance with the first aspect of the present invention. Preferably, the system 26 comprises an electronic control unit (ECU) comprising a computer program product containing computer program code executable in a computer or a processor to implement all the steps of a method according to the present invention.

The method for determining a safety zone of a foreign object according to the present invention comprises a step of determining the type of foreign object. This step may preferably comprise a step of determining at least one of the following features of the foreign object: the measure (e.g. width and/or height); the density; the surface structure; the position or the dynamic behaviour (e.g. velocity and/or acceleration). At least one of these features may preferably be determined by a method step using information from the at least one sensor 24 as input.

Instead of, or in addition to, the above features, the step of determining the type of foreign object may be carried out by a picture recognition system. An example of a picture recognition system which could be used in the method of the present invention is a system which is sold under the name of Mobileye.

Purely by way of example, a type of foreign object may be one of: a pedestrian; a cyclist or an automotive vehicle.

Once the type of foreign object has been determined, the method of the present invention sets a safety zone which corresponds to the type of foreign object. Examples of such safety zones will be presented hereinbelow.

Moreover, the method according to the present invention comprises a step of determining the traffic behaviour of the foreign object. The traffic behaviour determination step may preferably comprise a step of determining at least one of the position or the dynamic behaviour (e.g. velocity and/or acceleration) of the foreign object using input from the at least one sensor 24. The traffic behaviour thus determined is then compared to a predetermined group of traffic behaviours in order to establish if the current traffic behaviour corresponds to a species of the aforethe predetermined group of traffic behaviours.

The above method steps may be implemented in a plurality of ways. Purely by way of example, the step of determining the traffic behaviour of the foreign object may comprise a step of grading, or classifying, specific static and/or dynamic features of the foreign object. Consequently, the step of determining if the traffic behaviour corresponds to a species of a predetermined group of traffic behaviours may comprise a step of, for each species in the predetermined group of ranges, determining if the above grades lies within predetermined grade ranges for that species.

If it has been established that the traffic behaviour of the foreign object corresponds to a species of a predetermined group of traffic behaviours, the method of the present invention proposes that the safety zone be modified in accordance with a predetermined species function corresponding to the species. Such a species function generally involves a reduction of the safety zone as will be discussed further hereinbelow.

However, in certain species of the traffic behaviours, the species function may actually be an increase of the safety zone. Purely by way of example, a species of a traffic situation which may be associated with an increase of the safety zone may be when the foreign object shows a staggering or reeling behaviour.

Figure 2:
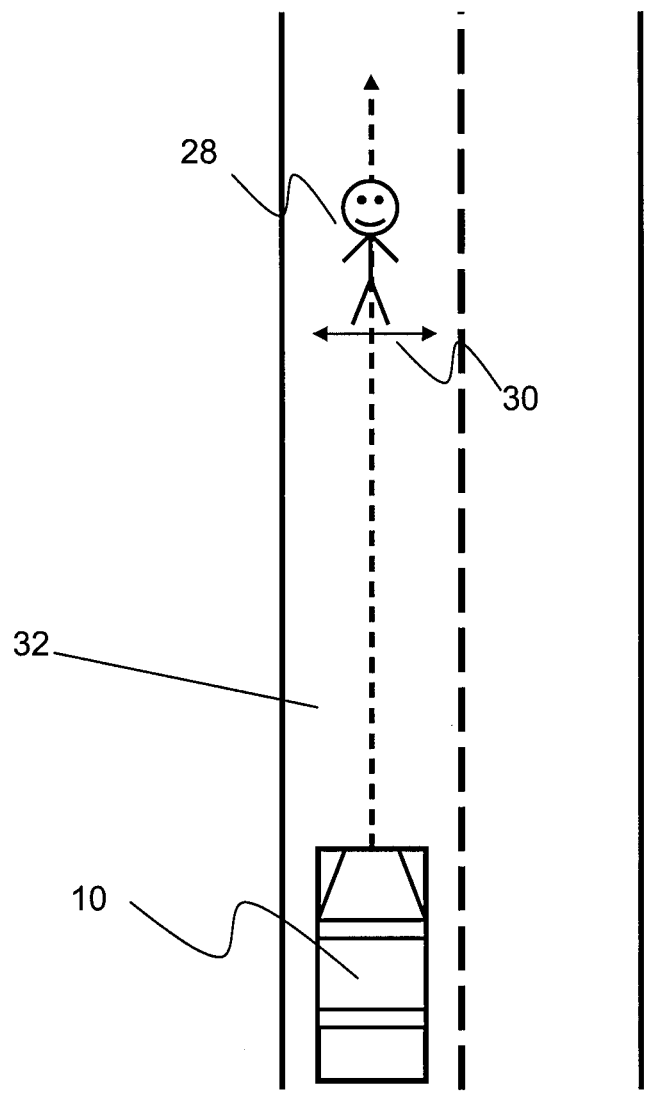
FIG. 2 illustrates a traffic situation involving the FIG. 1 vehicle and a pedestrian.

FIG. 2 illustrates an embodiment of the method of the present invention. As may be gleaned from FIG. 2, the foreign object 28 is in this case a pedestrian and the method according to the present invention preferably comprises a step of determining whether the foreign object is a pedestrian or not. In the situation illustrated in FIG. 2, the foreign object 28 actually is a pedestrian and the method according to the present invention comprises a step of setting the safety zone to a predetermined pedestrian safety zone. Purely by way of example, such a pedestrian safety zone may be within the range of 2-4 meters, preferably within the range of 2.5-3.5 meters, and most preferably be approximately 3 meters. Moreover, again purely by way of example, the pedestrian safety zone 30 may be dependent on at least one of: the width of the hosting vehicle 10, the width of a roadway 32, the width of the pedestrian 28 and/or the velocity of the vehicle 10.

The pedestrian 28 in FIG. 2 is stationary in the roadway 32. This is an example of a traffic behaviour wherein the safety zone need not be modified, since it is generally desired that the vehicle 10 passes the pedestrian 28, when located in the roadway 32, with a certain margin.

Figure 3:
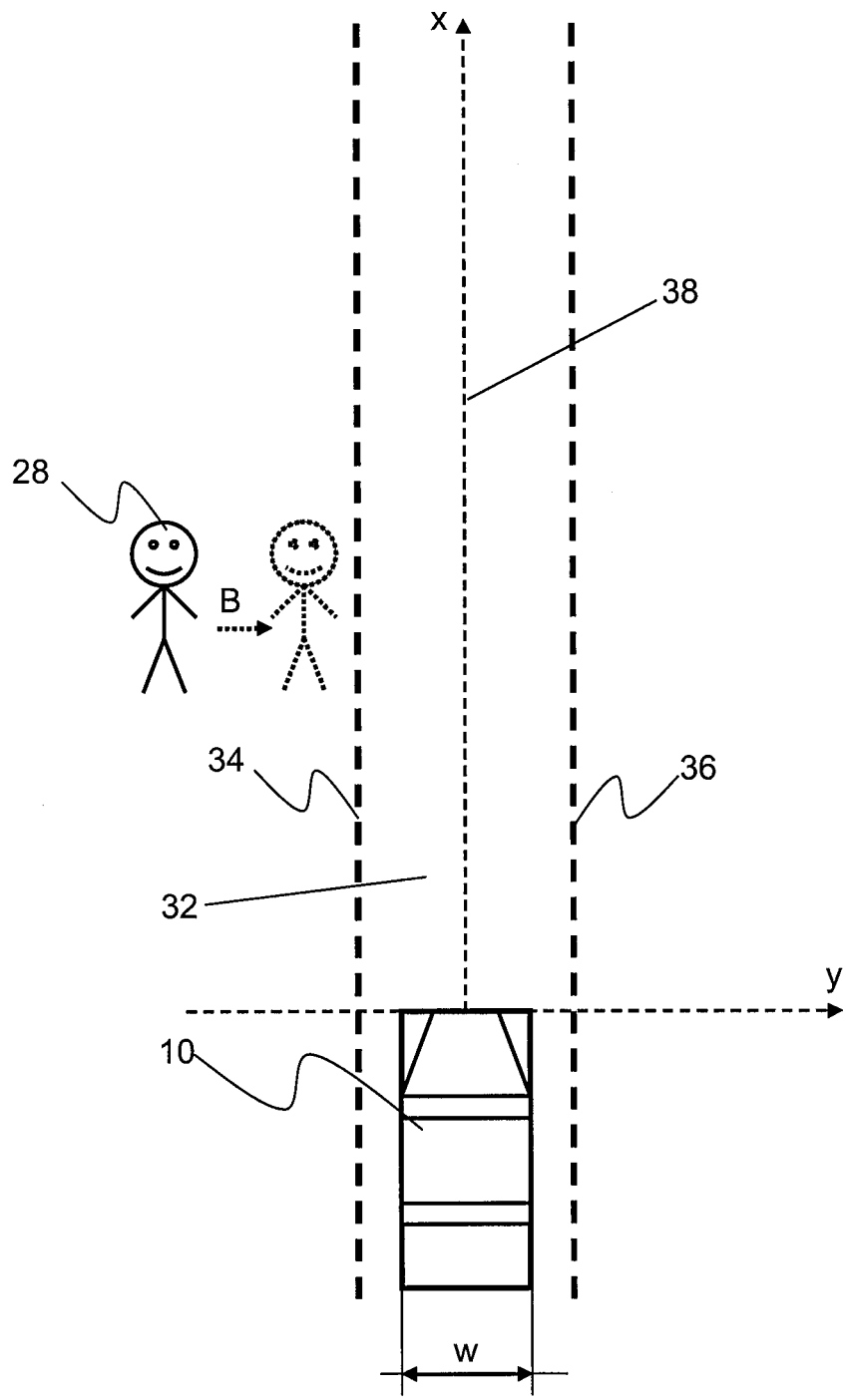
FIG. 3 illustrates another traffic situation involving the FIG. 1 vehicle and a pedestrian.

FIG. 3 illustrates a different traffic scenario as compared to FIG. 2. Again, the foreign object 28 is a pedestrian but in FIG. 3 the pedestrian 28 is walking towards the vehicle path but is expected to diverge from the vehicle path before colliding with the vehicle.

The pedestrian 28 may diverge from the vehicle path in a plurality of ways. Purely by way of example, the pedestrian 28 may simply stop before crossing the lane marker 34 or before entering the vehicle path. Optionally, the pedestrian 38 may change direction such that he starts walking parallel to, or even away from, the roadway 32. The method step of determining that the pedestrian actually is expected to diverge from the vehicle path may preferably comprise the steps of identifying a pedestrian measure indicative of at least one of the velocity or acceleration of the pedestrian 28.

Purely by way of example, the above method step may comprise the steps of determining the position and at least one dynamic property, such as the velocity or the acceleration, of the pedestrian in relation to the roadway 32. From the above information, a pedestrian deceleration required in order to be able to stop before entering the roadway 32 and/or vehicle path is determined. The pedestrian deceleration thus determined is then compared to a predetermined threshold deceleration value. If the pedestrian deceleration is lower than the threshold deceleration value, the pedestrian is expected to stop before entering the roadway 32 and/or vehicle path. Purely by way of example, the threshold deceleration value may be in the range of 3-4 m/s$^2$, and may preferably be approximately 3.5 m/s$^2$, when determining a safety zone 30 in order to evaluate whether an autonomous braking should be imparted on the vehicle 10 or not. When determining whether a warning should be issued or not, the threshold deceleration value may be in the range of 0.5 to 1 m/s$^2$ and may preferably be approximately 0.8 m/s$^2$.

It should be noted that although a straight roadway 32 is illustrated in FIG. 3, the FIG. 3 species of a traffic behaviour may also be identified for a non-straight roadway 32, for instance a curved roadway. In this case, information as regards for instance the curvature of the roadway 32 may be used.

Figure 4:
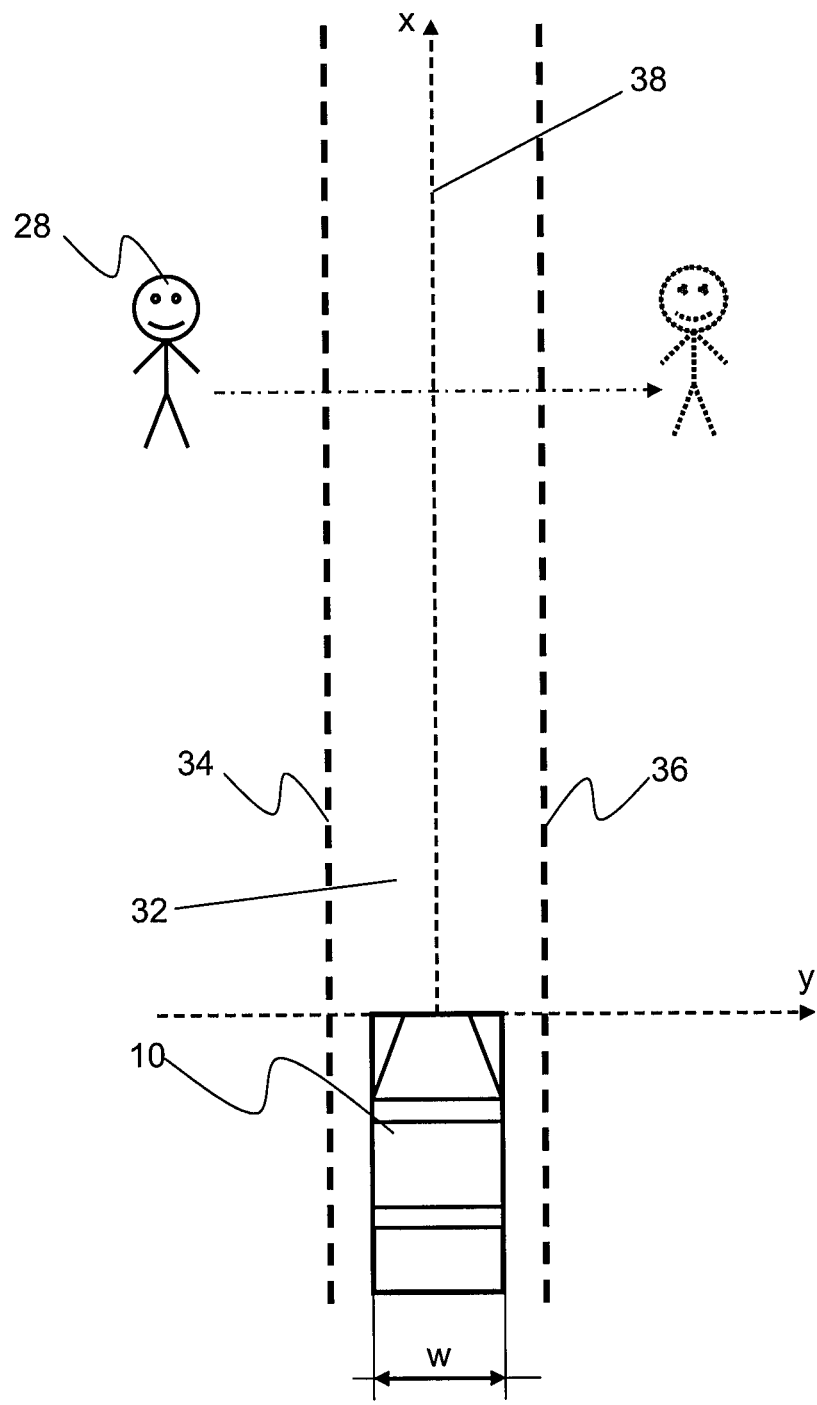
FIG. 4 illustrates a further traffic situation involving the FIG. 1 vehicle and a pedestrian.

FIG. 4 illustrates another species of the predetermined group of traffic behaviours. As may be gleaned from FIG. 4, the pedestrian 28 travels in a direction across the roadway 32 and consequently in front of the host vehicle 10. Moreover, the pedestrian 28 passes the front of the vehicle 10 in such a manner that he/she is expected to avoid collision with the vehicle 10. The fact that the pedestrian 28 in the FIG. 4 species is able to avoid collision with the vehicle 10 may be determined by method steps similar to the ones discussed in conjunction with the FIG. 3 species, i.e. establishing a pedestrian measure and comparing it to previously recorded pedestrian measures.

Figure 5:
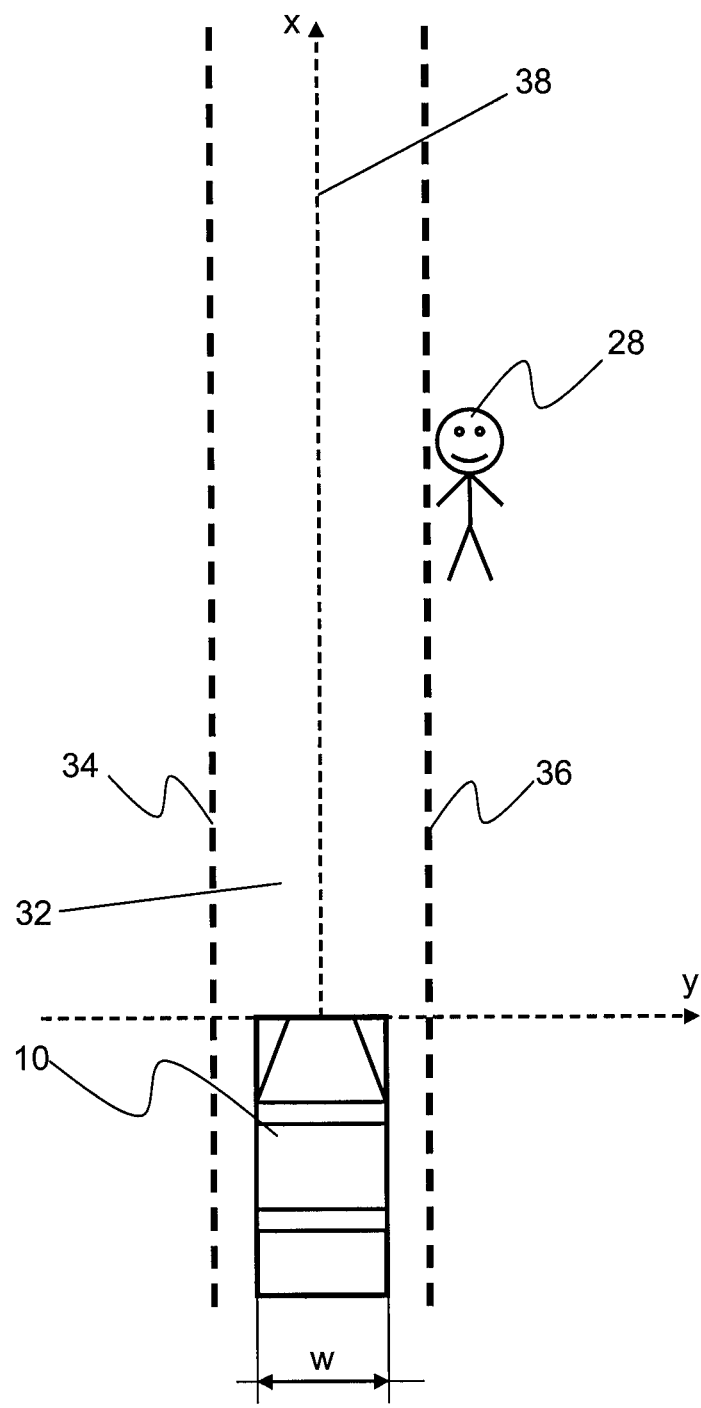
FIG. 5 illustrates yet another traffic situation involving the FIG. 1 vehicle and a pedestrian.

FIG. 5 illustrates yet another species of the predetermined group of traffic behaviours. In FIG. 5, the foreign object 28, which in the implementation in FIG. 5 is a pedestrian, remains stationary by the roadway 32.

Each one of the species presented in FIG. 3 to FIG. 5 is preferably associated with a species function which reduces the safety zone, preferably each species function comprises an operation of a subtraction by a predetermined value thus reducing the margin on one side or both sides of the foreign object 28.

The predetermined value may be the same for all the species presented in conjunction with FIG. 3 to FIG. 5. Purely by way of example, the predetermined value may be within the range of 1-2 meters. Optionally, each one of the species may be associated with an individual predetermined value.

Once the safety zone has been determined according to the above described method, the safety zone thus determined may preferably be used in a method for reducing the risk of a forward collision between a vehicle and a foreign object according to a second aspect of the present invention.

As such, the risk reduction method according to the second aspect of the present invention comprises a step of establishing the presence of the foreign object in front of the vehicle 10. This step is preferably carried out by utilizing input from the previously discussed sensor 24.

If it is determined that a foreign object is present in front of the vehicle 10, the method further comprises a step of determining a safety zone of the foreign object in accordance with the first aspect of the present invention, for instance by using any one of the method implementations illustrated in FIG. 3 to FIG. 5.

When the safety zone has been determined, a method of the second aspect of the present invention preferably comprises the following steps:
  determining if the vehicle 10 can avoid entering the safety zone 30, and
  if not, executing a collision risk reduction task.

A collision risk reduction task may for instance be initiating autonomous braking of the vehicle 10.

In order to determine whether the vehicle 10 can avoid entering the safety zone 30 or not, the method of the second aspect of the present invention preferably comprises a step of determining a braking threat number BTN. The braking threat number BTN is the deceleration $dec_{req}$ required in order to avoid entering the safety zone 30 divided by the maximum available deceleration $dec_{avail}$ for the vehicle 10, i.e.:

$$BTN = \frac{dec_{req}}{dec_{avail}} \quad \text{(Eq. 1)}$$

As may be realized from Eq. 1, if BTN is equal to or greater than one, the vehicle 10 has no possibility to decelerate to a zero speed before entering the safety zone 30. On the other hand, if BTN is less than one, it is possible to bring the vehicle 10 to a stop before it enters the safety zone 30. Purely by way of example, the maximum available deceleration $dec_{avail}$ for the vehicle 10 may be approximately 10 m/s².

In a similar vein as for the braking threat number BTN, the method of the second aspect of the present invention may comprise a step of determining a steering threat number STN. The steering threat number STN is defined as the minimum lateral acceleration required $a_{lat,req}$ in order to avoid entering the safety zone 30, on either the left or the right side, divided by the maximum available lateral acceleration $a_{lat,avail}$ for the vehicle 10, i.e.:

$$STN = \frac{a_{lat,req}}{a_{lat,avail}} \quad \text{(Eq. 2)}$$

As may be realized from Eq. 2, if STN is equal to or greater than one, it will not be possible for a driver of the vehicle 10 to avoid entering the safety zone 30 by a steering manouver. On the other hand, if STN is less than one, the driver may steer away from the zone 30. Purely by way of example, the maximum available lateral acceleration $a_{lat,avail}$ for the vehicle 10 may be approximately 7 m/s². It should be noted that the maximum available lateral acceleration may be dependent on inter alia the speed of the vehicle 10, viz a low speed of the vehicle 10 results in a reduction of the maximum available lateral acceleration $a_{lat,avail}$.

The method according to the second aspect of the present invention preferably uses at least one of the above discussed parameters, i.e. braking threat number BTN or steering threat number STN, when determining whether the vehicle 10 can avoid entering the safety zone 30 or not. In one embodiment of the second aspect of the present invention, the method comprises the steps of comparing the braking threat number BTN with a predetermined braking threat number threshold value $BTN_{max}$ and comparing the steering threat number STN with a predetermined steering threat number threshold value STN.

If, from the above comparison, it is concluded that the braking threat number BTN exceeds the predetermined braking threat number threshold value $BTN_{max}$ and/or that the steering threat number STN exceeds the predetermined steering threat number threshold value $STN_{max}$, a collision risk reduction task, preferably autonomous braking, is initiated.

The braking threat number threshold value $BTN_{max}$ and the steering threat number threshold value $STN_{max}$ need not to be the same, but preferably each one of the aforementioned threshold values lies within the range of 0.5-1, preferably within the range of 0.8-1, most preferably within the range of 0.9-1. In embodiments of the method of the present invention, the braking threat number threshold value $BTN_{max}$ and/or the steering threat number threshold value $STN_{max}$ may be dependent on the speed of the vehicle 10. Purely by way of example, at least one, but preferably both, of the above threshold values may decrease as the speed of the vehicle 10 increases.

In addition to, or instead of, executing a collision risk reduction task, the second aspect of the present invention may comprise method steps of issuing a warning to the driver whenever there is an imminent risk that the vehicle will enter the safety zone 30 of a foreign object 28. The method preferably involves the steps of determining if the vehicle 10 can avoid entering the safety zone 30 in a controlled manner, and if not, issuing a warning.

The method steps for determining if the vehicle 10 can avoid entering the safety zone 30 in a controlled manner may preferably be similar to the above discussed steps for determining whether the vehicle 10 can avoid entering the safety zone 30 at all.

As such, the step of determining if the vehicle can avoid entering the safety zone in a controlled manner preferably comprises the step of determining a warning braking threat number WBTN. The warning braking threat number WBTN is the deceleration required deceleration $dec_{req}$ to avoid entering the safety zone divided by the maximum deceleration $dec_{avail,driver}$ that a driver normally uses when braking hard, i.e.:

$$WBTN = \frac{dec_{req}}{dec_{avail,driver}} \quad \text{(Eq. 3)}$$

As may be realized from Eq. 3, if WBTN is equal to or greater than one, the driver of the vehicle 10 is not likely to slow down the vehicle 10 to a zero speed before entering the safety zone 30 by braking hard. On the other hand, if WBTN is less than one, it is possible for the driver to bring the vehicle 10 to a stop in a controlled manner, by actuating the brake pedal for instance, before it enters the safety zone 30. Purely by way of example, the maximum deceleration $dec_{avail,driver}$ that a driver normally uses when braking hard may be within the range of 5 to 6 m/s2, i.e. 50% to 60% of the maximum available deceleration $dec_{avail}$ for the vehicle 10.

The warning issuing method steps of the second aspect of the present invention may preferably also comprise the steps of determining a warning steering threat number WSTN. The warning steering threat number WSTN is the lateral acceleration required $a_{lat\ req}$ in order to avoid entering the safety zone 30 divided by the maximum lateral acceleration $a_{lat,driver}$ that a driver normally imparts the vehicle 10, i.e.:

$$WSTN = \frac{a_{lat,req}}{a_{lat,driver}} \quad \text{(Eq. 4)}$$

Purely by way of example, the maximum lateral acceleration $a_{lat,driver}$ that a driver normally imparts on the vehicle 10 may be approximately 1.5 m/s2 and may be reduced with decreasing speed of the vehicle 10.

The method according to the second aspect of the present invention preferably uses at least one of the above discussed parameters warning braking threat number WBTN or warning steering threat number WSTN when determining whether the vehicle 10 can avoid entering the safety zone 30 in a controlled manned or not. In one embodiment of the second aspect of the present invention, the method comprises the steps of comparing the warning braking threat number WBTN with a predetermined warning braking threat number threshold value $WBTN_{max}$ and comparing the warning steering threat number WSTN with a predetermined steering threat number threshold value $WSTN_{max}$.

If, from the above comparison, it is concluded that the warning braking threat number WBTN exceeds the predetermined warning braking threat number threshold value $WBTN_{max}$ and/or that the warning steering threat number WSTN exceeds the predetermined warning steering threat number threshold value $WSTN_{max}$, a warning is issued.

The warning braking threat number threshold value $WBTN_{max}$ and the warning steering threat number threshold value $WSTN_{max}$ need not to be the same, but preferably each one of the aforementioned threshold values lies within the range of 0.05-0.15 and may preferably be approximately 0.1. In embodiments of the method of the present invention, the warning braking threat number threshold value $WBTN_{max}$ and/or the warning steering threat number threshold value $WSTN_{max}$ may be dependent on the speed of the vehicle 10. Purely by way of example, at least one, but preferably both, of the above threshold values may decrease as the speed of the vehicle 10 increases.

The method steps of determining at least one of the braking threat number BTN, the warning braking threat number WBTN, the steering threat number STN and/or the warning steering threat number WSTN preferably comprise a step of determining the reaction time of the driver and/or vehicle and using this information when determining at least one of the aforethe threat numbers BTN, WBTN, STN, WSTN. In the presentation hereinbelow, the warning braking threat number WBTN is used as an example, although it should be pointed out that the method steps below are equally applicable to any one of the other threat numbers BTN, STN, WSTN.

The reaction time $T_R$ of the driver may be determined in a plurality of ways. Purely by way of example, the reaction time $T_R$ may be determined based on experience and/or previously collected data which may or may not involve any measurements or estimates of the reaction time of the person actually driving the vehicle 10. Instead of, or in addition to, the previously discussed reaction time $T_R$ estimate, the method of the present invention may comprise method steps of determining the reaction time of the present driver of the vehicle 10, for instance by recording how the driver behaves in certain traffic situations and from that information estimating a reaction time $T_R$.

The reaction time $T_R$ may also comprise a portion as regards the reaction time of the vehicle 10, i.e. the time required for the vehicle 10 to assume a required risk reduction configuration, e.g. a delay time for activating the braking system 12 of the vehicle 10. When determining the braking threat number BTN, and/or the steering threat number STN, the vehicle's reaction time may constitute the major part, and in some implementations even the total, of the reaction time $T_R$ used when determining the corresponding threat number.

Once the reaction time $T_R$ has been determined, the deceleration required $dec_{req}$ to avoid entering the safety zone may be determined using inter alia the reaction time $T_R$, the velocity of the vehicle 10 and the distance to the safety zone 30 as input.

Figure 6:
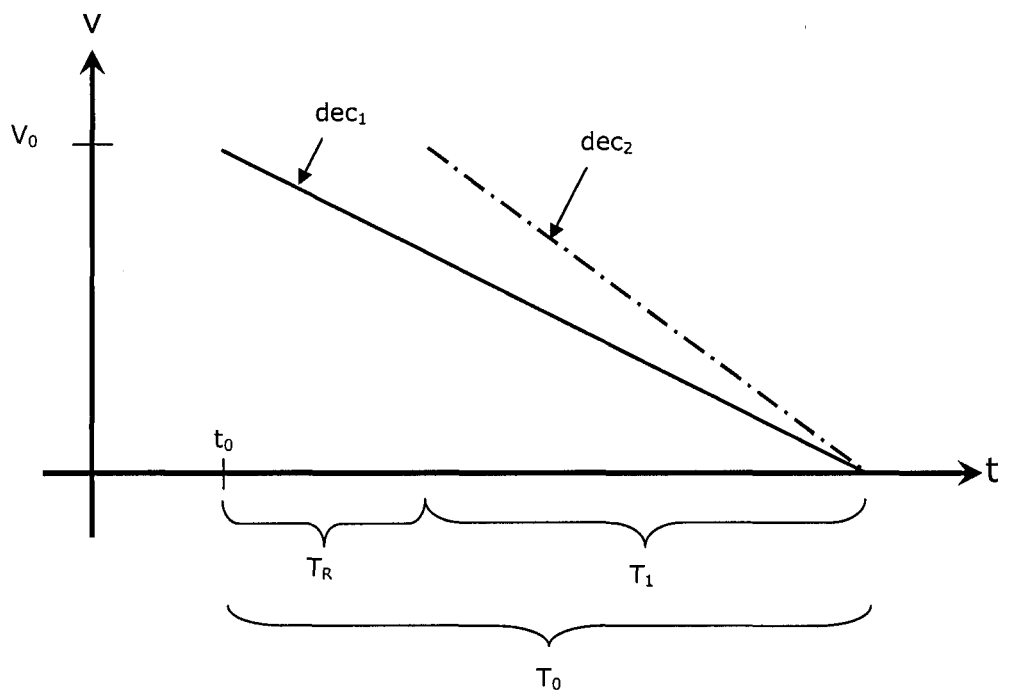
FIG. 6 is a diagram illustrating different decelerations of a vehicle.

An example of how the above inputs may be used for determining the deceleration required $dec_{req}$ to avoid entering the safety zone is presented hereinbelow with reference to FIG. 6. FIG. 6 illustrates a traffic situation wherein the vehicle 10 is travelling with a certain speed v0 at a certain time instant t0 and is requested to stop within a first stop time T0 in order to avoid entering a safety zone 30 of a foreign object 28. Purely by way of example, the sensor of the vehicle 24 could be used for determining a distance S to the safety zone 30 at the time instant t0 and the first stop time T0 may be calculated as the time needed to slow down the vehicle 10 to a stop before the vehicle has traveled the distance S, i.e. satisfying the following relation:

$$S = \int_{t_0}^{t_0+T_0} v(t)dt \quad \text{(Eq. 5)}$$

Assuming constant deceleration, i.e. an affine velocity reduction, the first stop time $T_0$ may be calculated as:

$$T_0 = \frac{2 \cdot S}{v_0} \quad \text{(Eq. 6)}$$

Using the value of first stop time $T_0$ as determined hereinabove, and also the previously discussed assumption of an affine velocity reduction, a first deceleration required dec1 to avoid entering the safety zone may be calculated as:

$$dec_1 = \frac{v_0}{T_1} \quad \text{(Eq. 7)}$$

An example of a first deceleration established in accordance with Eq. 7 is illustrated as a continuous line in FIG. 6.

However, since the driver of the vehicle 10 generally needs a reaction time $T_R$ before he/she initiates braking, i.e. the speed reduction operation, the stop time available for stopping the vehicle 10 is actually less than the first stop time $T_0$. Instead, the vehicle 10 has to stop within a second stop time $T_1$ which is the first stop time $T_0$ subtracted by the reaction time $T_R$. As such, again assuming a constant deceleration of the vehicle 10, a second deceleration required $dec_2$ to avoid entering the safety zone 30 may be calculated as:

$$dec_2 = \frac{v_0}{T_1 - T_R} \quad \text{(Eq. 8)}$$

The second deceleration required $dec_2$ is preferably used as the deceleration required $dec_{req}$ to avoid entering the safety zone in the previously described method steps for determining if the driver can avoid entering the safety zone in a controlled manner.

As supported above, the present invention relates to a method for reducing the risk of a forward collision between a vehicle and a foreign object. Further, the present invention relates to a computer program product implemented to execute all the steps of any of the above methods; an electronic control unit comprising such a computer program product; an automotive forward collision risk reduction system comprising such an electronic control unit and an automotive vehicle comprising such a system. Moreover, the present invention relates to a method of upgrading an automotive vehicle forward collision risk reduction system.

The invention is not limited to the above-described embodiments, but may be varied within the scope of the following claims. As an example, it should be noted that although the example hereinabove has used the assumption that the deceleration is constant, the concept of introducing the reaction time $T_R$ when determining the required deceleration may be used for other types of deceleration behaviours.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a forward collision risk reduction system of a vehicle comprising:
   operating a sensor to detect a foreign object;
   operating an electronic control unit to determine, based at least in part upon signals received from the sensor, a type of the foreign object and at least one of a velocity and an acceleration of the foreign object;
   establishing a safety zone to be avoided by the vehicle defined relative to and extending from the foreign object and having a width measured relative to the foreign object and approximately perpendicular to a direction of movement of the vehicle, the width set to a first value based on the type of the foreign object;
   determining a traffic behavior of the foreign object based on the at least one of the velocity and the acceleration;
   determining if the traffic behavior corresponds to a species of a predetermined group of traffic behaviors; and
   if the traffic behavior corresponds to a species of a predetermined group of traffic behaviors, modifying the width of the safety zone to a second value in accordance with a predetermined species function corresponding to the species.

2. The method according to claim 1 wherein:
   the type of the foreign object is determined to be a pedestrian, and
   the first value of the safety zone is set to a predetermined pedestrian safety zone value.

3. The method according to claim 1 wherein the predetermined group comprises a species that the foreign object is travelling towards a vehicle path of the vehicle but is expected to diverge from the vehicle path before colliding with the vehicle.

4. The method according to claim 1 wherein the predetermined group comprises a species that the foreign object is passing in front of the vehicle and it is estimated to avoid collision with a predetermined risk reduction margin.

5. The method according to claim 1 wherein the predetermined group comprises a species that the foreign object is stationary besides the vehicle path.

6. The method according to claim 1 further comprising modifying a dimension of the safety zone in the direction of movement of the vehicle from a first value to a second value.

7. The method according to claim 1 wherein the second value is less than the first value if an acceleration of the foreign object indicates the foreign object to be decelerating at a rate less than a deceleration threshold.

8. The method according to claim 7 wherein the deceleration threshold is in the range of 3-4 m/s$^2$.

9. The method of claim 1 wherein the second value is greater than the first value if an acceleration of the foreign object indicates the foreign object to be decelerating at a rate greater than a deceleration threshold.

10. The method according to claim 1 further comprising determining if the vehicle can avoid entering the safety zone by determining a braking threat number (BTN), the braking threat number (BTN) being the deceleration (decreq) required to avoid entering the safety zone divided by the maximum available deceleration (decavail) for the vehicle.

11. The method according to claim 1 further comprising determining if the vehicle can avoid entering the safety zone by determining a steering threat number (STN), the steering threat number (STN) being the lateral acceleration (alat,req) required to avoid entering the safety zone divided by the maximum available lateral acceleration (alat,avail) for the vehicle.

12. The method according to claim 11 further comprising determining if the vehicle can avoid entering the safety zone by determining that the vehicle cannot avoid entering the safety zone when each one of the braking threat number (BTN) and the steering threat number (STN) exceeds a predetermined threat number threshold value (BTNmax, STNmax).

13. The method according to claim 1 further comprising determining if the vehicle can avoid entering the safety zone in a controlled manner, and if not, issuing a warning.

14. The method according to claim 13 further comprising determining if the vehicle can avoid entering the safety zone in a controlled manner by determining a warning braking threat number (WBTN), the warning braking threat number (WBTN) being the required deceleration (decreq) required to avoid entering the safety zone (30) divided by the maximum deceleration (decavail,driver) that a driver normally uses when braking hard.

15. The method according to claim 13 further comprising determining if the vehicle can avoid entering the safety zone in a controlled manner by determining a warning steering threat number (WSTN), the warning steering threat number (WSTN) being the lateral acceleration (alat req) required to avoid entering the safety zone (30) divided by the maximum lateral acceleration (alat,driver) that a driver normally imparts the vehicle.

16. The method according to claim 13 further comprising determining if the vehicle can avoid entering the safety zone in a controlled manner by determining that the vehicle (10) cannot avoid entering the safety zone when each one of the warning braking threat number (WBTN) and the warning steering threat number (WSTN) exceeds a predetermined warning threat number threshold value (WBTNmax, WSTNmax).

17. The method according to claim 13 further comprising determining if the vehicle can avoid entering the safety zone in a controlled manner by determining the reaction time (TR) of the driver, and using the reaction time when determining the warning braking threat number (WBTN) and/or the warning steering threat number (WSTN).

18. For use with a forward collision risk reduction system of a vehicle traveling a roadway, a method comprising the steps of:
- operating a sensor to detect a foreign object approaching the roadway;
- operating an electronic control unit to determine a type of the foreign object, and determine a deceleration of the foreign object;
- establishing a safety zone to be avoided by the vehicle, the safety zone defined relative to and extending from the foreign object and having a width set to be a first value based on the type of the foreign object;
- modifying the width of the safety zone from the first value to a second value based on the deceleration.

19. The method of claim 18 wherein the second value is less than the first value and determined in the event the deceleration is greater than a deceleration threshold.

20. For use with a forward collision risk reduction system of a vehicle, a method comprising the steps of:
- operating a sensor to detect a foreign object;
- operating an electronic control unit to determine a type of the foreign object and determine at least one of a velocity and a deceleration of the foreign object;
- establishing a safety zone to be avoided by the vehicle, the safety zone defined relative to and extending from the foreign object and having a width of a first value based on the type of the foreign object;
- determining a behavior of the foreign object based on the at least one of the velocity and the acceleration;
- determining if the traffic behavior corresponds to a plurality of a predetermined group of traffic behaviors;
- if the traffic behavior corresponds to one of a plurality of a predetermined group of traffic behaviors, modifying the width of the safety zone from the first value to a second value in accordance with the corresponding one of the plurality of predetermined group of traffic behaviors; and
- determining at least one of:
  i. if the vehicle can avoid entering the safety zone by determining a braking threat number (BTN), the braking threat number (BTN) being the deceleration (decreq) required to avoid entering the safety zone divided by the maximum available deceleration (decavail) for the vehicle;
  ii. if the vehicle can avoid entering the safety zone by determining a steering threat number (STN), the steering threat number (STN) being the lateral acceleration (alat,req) required to avoid entering the safety zone divided by the maximum available lateral acceleration (alat,avail) for the vehicle; and
  iii. if the vehicle can avoid entering the safety zone by determining that the vehicle cannot avoid entering the safety zone when each one of the braking threat number (BTN) and the steering threat number (STN) exceeds a predetermined threat number threshold value (BTNmax, STNmax).

* * * * *